Aug. 24, 1926.
C. F. HANSON ET AL
CRUDE TOPPING PLANT
Filed Dec. 29, 1922   2 Sheets-Sheet 1
1,597,375
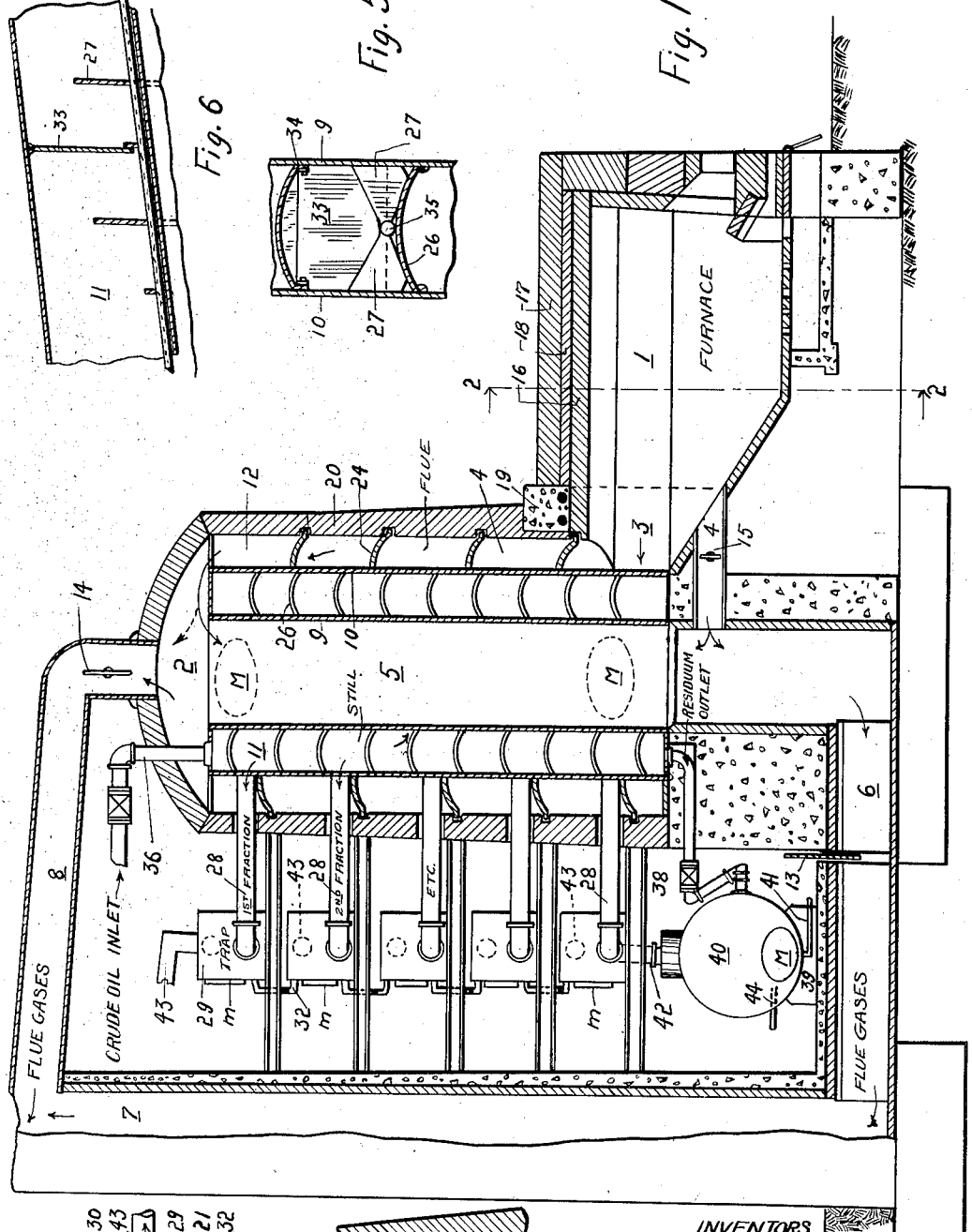
INVENTORS
PERRY VANDERVORT
CLARENCE F. HANSON
By Hazard and Miller
ATTORNEYS Aug. 24, 1926.　　　　　　　　　　　　　　　1,597,375
C. F. HANSON ET AL
CRUDE TOPPING PLANT
Filed Dec. 29, 1922　　　2 Sheets-Sheet 2
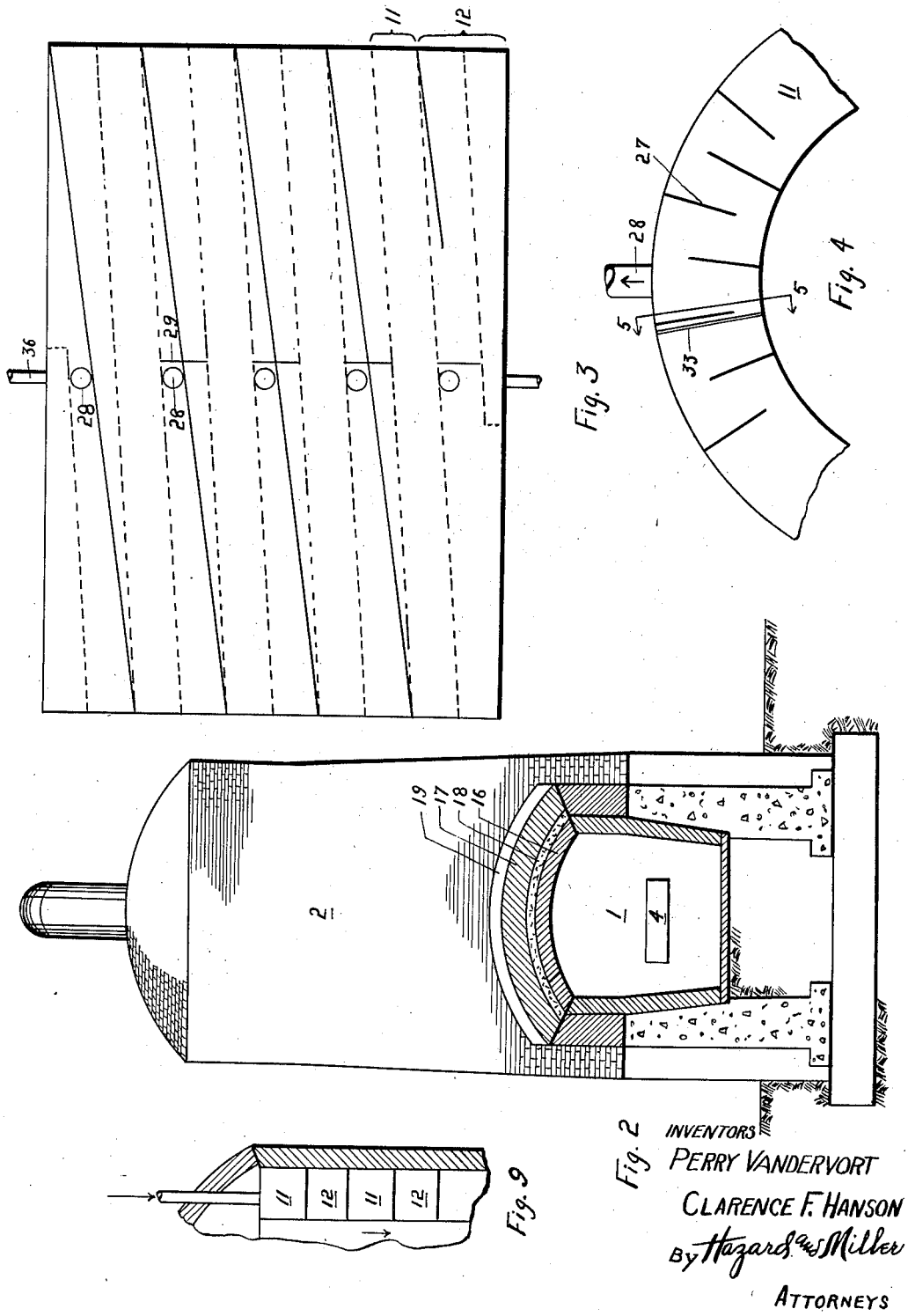
INVENTORS
PERRY VANDERVORT
CLARENCE F. HANSON
By Hazard & Miller
ATTORNEYS Patented Aug. 24, 1926.

1,597,375

UNITED STATES PATENT OFFICE.

CLARENCE F. HANSON, OF LOS ANGELES, AND PERRY VANDERVORT, OF EL SEGUNDO, CALIFORNIA.

CRUDE TOPPING PLANT.

Application filed December 29, 1922. Serial No. 609,590.

Our present invention is a topping plant for crude oil or the like, a special object of our invention being the recovery of the lighter constituents from natural or other mixtures of hydrocarbon oils; one object of our invention is the providing of efficient and economical means for the recovery of a maximum quantity of gasoline or an equivalent product suitable for use in internal combustion engines.

It is a further object of our invention to simplify the construction of means of the general character indicated, at the same time reducing the cost of production and increasing the yield of gasoline, or equivalent product, obtainable from a given quantity of mixed hydrocarbons containing the same.

It is a further object of our invention to utilize to the fullest extent possible the heat of flue gases employed for the distillation of hydrocarbons.

It is a further object of our invention to provide means whereby the descending body of hydrocarbon oils may be subjected to a prolonged heat transferring exposure to flue gases moving in an opposite direction thereto, and also to provide means in the form of alternative openings for permitting flue gases to escape without further exposure of the oils to the heat thereof, these alternative flues being employed mainly in emergencies, or when an oil mixture of unusual composition is encountered.

It is a further object of our invention to utilize the principle of the spiral in effecting a maximum exposure of an oil mixture to heating gases within a minimum space, and we prefer to provide means whereby the oil mixture may descend a spiral more gradual than that along which the heating gases are made to ascend.

It is a further object of our invention to provide means whereby, after the flue gases have imparted their heat by the traversing of a spiral course outside of the descending body of mineral oil, the said flue gases may either be permitted to escape or to descend through a central passage within which they may impart further heat to the oils undergoing treatment; and we may provide also an alternative passage through which, when the temperature must be promptly changed, products of combustion may be permitted to escape directly into the central passage, without giving up any of their heat to the oils, or rising to impart some heat thereto.

It is a further object of our invention to provide means for the separate withdrawal of various cuts or fractions at various levels from a descending body of oil, the lower portions of which are exposed to the greatest heat; and we prefer to provide also curtains or equivalent baffling means whereby the vapors generated in any one region or section of our apparatus shall be confined thereto until they shall escape through the vapor passage connected therewith, the mentioned baffling means being such as to prevent vapors which are set free in the lower portion of our apparatus from finding their way to the top thereof.

It is a further object of our invention to provide suitable means for retarding the flow of the oils as they descend through our still, our oil baffling means being preferably staggered and provided with apertures near the bottom thereof, as hereinafter described.

It is an incidental object of our invention, which broadly comprises a furnace having an arched top and a still confined in a vertical cylindrical chamber traversed by the flue gases escaping from said furnace, to provide suitable supporting means at the junction of said furnace with said cylindrical chamber, this supporting means preferably comprising a concrete arch of the specific character hereinafter described.

Our invention will be readily understood from the following detailed description of a preferred embodiment taken in conjunction with the accompanying drawings, in which—

Figure 1 is a vertical section through our topping plant comprising a furnace having a horizontal arched top and a cylindrical chamber comprising a still.

Fig. 2 is a vertical section of the same on the line 2—2 of Fig. 1.

Fig. 3 is a diagrammatic development intended to show the relationship and character of the respective spiral passages through which the oils descend and the flue gases from our furnace ascend within the mentioned cylindrical chamber.

Fig. 4 is a detail showing in plan one of the spiral passages referred to and an outlet therefrom.

Figs. 5 and 6 are respectively vertical sections taken at right angles one to another to show the interior construction of one of the spiral flues through which the oil descends, Fig. 5 being taken on the line 5—5 of Fig. 3.

Fig. 7 shows the interior construction of one of the vapor traps with which the respective vapor outlets from our still are connected.

Fig. 8 is a detail view showing a flue, as hereinafter described.

Fig. 9 is a diagrammatic representation of an alternative form of our cylindrical chamber provided with spiral passages for oil and flue gases.

In the preferred embodiment of our invention we prefer to provide a furnace 1, which may be of usual construction except as hereinafter indicated, and adjacent to it a cylindrical chamber 2, passages for the escape of flue gases from the furnace to the cylindrical chamber being indicated at 3 and 4'. The opening 3 preferably connects directly with a spiral passage 4 in said chamber, and after reaching the top thereof, the flue gases may ordinarily be made to descend through an interior passage 5 connecting, by means of a horizontal passage 6, with the stack 7, an alternative escape for the flue gases being, however, indicated at 8.

From an inspection of Fig. 1 of the drawings, it will be apparent that, in the embodiment shown, we may provide within the chamber 2 a plurality of concentric cylindrical elements 9 and 10, whose walls may be substantially parallel with exterior walls of the chamber 2; and between these walls we may provide, by means of arched plates arranged spirally therein, separate conduits through one of which flue gases may ascend in the manner already indicated, the other being provided at or near its top with means for the introduction of a mixture of mineral oils, or the like, to be distilled.

The innermost of the passages referred to thus constitutes a spiral conduit 11 through which mineral oils may continuously descend while receiving heat from the flue gases gradually rising through the exterior conduit 12; and when the flue gases have reached the top of the chamber they may be made to pass toward the center of the cylindrical chamber in order to impart further heat to the mineral oils while descending through said chamber to escape through the stack 7 by means of the conduit 6. In this last mentioned conduit we prefer to provide a gate such as 13 by which the escape of flue gas may be regulated and also prefer to provide above the dome at the top of the cylindrical chamber a damper 14 within the conduit 8. There being also a damper 15 in the passage 4' leading directly from the furnace into the bottom of the interior passage 5, it will be obvious that by the use of the respective gates and dampers mentioned, a complete control of a movement of the hot flue gases is rendered possible and desired heat, either at the bottom or the top of the conduit 11 may be provided, in an emergency or in the handling of oils of unusual composition, by diverting a portion of the hot flue gases through the passage 11, or by diverting a portion of the partially cooled gases through the conduit 8 directly into the stack 7

While the essential features of our invention are capable of use with any furnace of usual construction, we may state that we prefer to provide a lining 16 of refractory material, such as fire brick, and an exterior shell 17 of ordinary brick, the space between the lining and the shell being filled with a suitable heat insulating material 18, such as silocel. While we prefer to employ, adjacent to our furnace, a cylindrical chamber of the character described, it will be understood that many of the advantages of our invention might be retained even if the chamber comprising our spiral conduits were arranged horizontally or inclined.

When the cylindrical chamber is vertical, as we prefer to construct it, there arises a special architectural problem in the strengthening of the region where the horizontal top of our preferred form of furnace joins the cylindrical chamber, and this problem we have solved by the introduction of a reinforced concrete arch 19 of the character clearly shown in Figs. 1 and 2, this arch being protected upon its lower surface by the use of refractory material in the manner shown.

While any suitable means may be employed to provide a spiral passageway between the cylindrical element 10 and the exterior wall 20 of the vertical chamber 2, we prefer to construct this spiral passageway in the manner best indicated in Fig. 8, from which it will be understood that we may first secure brackets or lugs 21 to the wall 10, thereafter so placing a slightly arched piece of sheet metal 23, suitably formed, as to support a body 24 of refractory material, such as fire clay, which may be permitted to extend into spiral passage 25, formed in wall 20. It will be understood that when the hot flue gases act upon the fire clay disposed in the manner indicated, this fire clay will harden into a permanent shelf, and the subsequent disintegration of the sheet metal support 23 will become a matter of indifference.

The spiral passage 11, through which the mixture of mineral oils may descend, is preferably formed in the manner best shown in Fig. 5. From the inspection of this figure, it will be understood that upwardly curved sheet metal elements 26 are preferably secured at their edges to the cylindrical members 9 and 10; and within the spiral conduit so formed we prefer to provide a staggered series of baffles 27 extending from opposite sides toward the center of the conduit.

In order to provide for the withdrawal and separate collection of the various fractions or cuts which our apparatus is adapted to obtain from a natural crude oil or other oil mixture, we prefer to provide a series of conduits 28, leading from the superimposed convolutions of the spiral passage 11 into a corresponding series of traps 29, from which the various fractions may be led to towers, to undergo therein any usual treatment. The respective traps 29 are preferably provided with an inlet at their lower portions and an outlet near the top thereof, each trap being provided with baffles 30—31 and also with means, such as a valved pipe 32 by which a fraction may be withdrawn from the lower portion of any trap into the upper portion of a trap beneath it.

Within the spiral passage 11 we prefer to provide not only the mentioned baffles adapted to retard the descent of the oil therethrough, but also curtains 33 (best shown in Figs. 5 and 6). One of these curtains or vapor baffles is preferably provided adjacent to and on the upper side of each of the vapor outlets 28, the mentioned curtains being preferably pivoted at or near the top thereof, as shown at 34. We find it advantageous to be able to introduce steam into certain portions of the conduit 11, and for this purpose we may provide a pipe 35, shown as extending longitudinally thereof and in contact with the upper portion of the arched plate 26, the steam being jetted laterally down.

It will be understood that oil introduced by means of the valved pipe 36 will gradually descend through the spiral passage 11, heated to a maximum degree near the bottom thereof by hot flue gases entering at 3; and that as the descending oil is heated to increasing temperatures successive fractions thereof are volatilized, the lightest constituents being permitted to escape through the uppermost of the conduits 28, and the upward movement of any fraction beyond the convolution within which it may be vaporized being prevented by the curtains 33 adjacent the respective vapor outlets. After the lighter constituents have escaped, the heavier constituents will escape through the lower conduits 28 and a tarry residue may be withdrawn through the valved pipe 37. As a precaution, in case of fire, we prefer to provide the valve 38, in this pipe, with means for a remote control not shown; and we also prefer to provide at 39 under the tar receptacle 40, a heating means as well as a valved outlet pipe 41 and a vapor pipe 42 leading to the trap 29 immediately thereover. By the use of the heating means 39 in conjunction with this vapor pipe 42 it becomes possible for us to effect a further distillation of the tarry residue collected in the receptacle 40, thereby producing, for example, a road oil, roof oil, or similar product, without the use of a separate still. For this use, a steam spray 44 may be provided in 40.

It is believed that the preferred construction of our apparatus will be readily understood from the foregoing description, the described arrangement of flues, curtains and outlets being best indicated in Figs. 3 and 4, the dotted lines in Fig. 3 being intended to show a development upon a vertical plane of the conduit through which the oils descend, and the solid lines being intended to show passages through which the flue gases rise.

An alternative form is shown in Fig. 9, this form requiring but one cylindrical wall within the chamber, and the flue gases and oil being permitted to move in superimposed spirals. This is a simplified construction, but we prefer a construction in which the smoke flues shall have a more rapid pitch than the oil conduit. It will be understood that manholes M may be provided as required throughout our apparatus, and we may add that Figs. 1 and 2 are intended to show approximately upon a true scale the relative proportions of an apparatus in which the vertical chamber may be ten feet across.

It will be obvious to those skilled in the art that various features of our invention may be independently used, and that modifications may be made therein without departure from the spirit of our invention as indicated in the foregoing description and in the following claims.

In the form shown, vapors suitable for gasoline may be collected through, for example, the uppermost three of the traps 29, any condensate in one of the traps 29 being led into the vapor space of the trap next lower down. The vapors led from the respective trap outlets 43 may be conducted to towers (not shown) and to heat exchangers (not shown) of any known construction; and the oil mixture introduced at 36 may have been thereby deprived of its lightest constituents before entering the conduit 11, means for the preliminary treatment of the oil and for the finishing treatment of the fractions being no part of our present invention.

What is claimed is:—

1. An oil still comprising means providing a helical oil passage, an oil inlet adjacent the top of said passage, means providing a helical hot gas passage adjacent the outer side of said oil passage having an inlet adjacent its bottom, means providing an inside gas passage adjacent the inner side of said oil passage, said helical passages being so arranged that oil descending within the oil passage will flow in a direction opposite to the flow of gases ascending in the helical gas passage, and means for directing gases on reaching the top of the helical gas passage into said inside passage, said oil passage having outlets at various levels and presenting an upwardly convex bottom so as to tend to divide the descending oil into two streams, each of which is adjacent a gas passage.

2. An oil still comprising means providing a helical oil passage, an oil inlet adjacent the top of said passage, means providing a helical hot gas passage adjacent the outer side of said oil passage having an inlet adjacent its bottom, means providing an inside gas passage adjacent the inner side of said oil passage, said helical passages being so arranged that oil descending within the oil passage will flow in a direction opposite to the flow of gases ascending in the helical gas passage, and means for directing gases on reaching the top of the helical gas passage into said inside passage, said oil passage having outlets at various levels and having baffle plates arranged therein extending inwardly from the sides so as to cause the descending oil to flow from side to side and thus flow adjacent one gas passage and then adjacent another.

3. In an oil still, an oil passage, and means providing gas passages adjacent each side of the oil passage, said oil passage presenting an upwardly convex bottom tending to divide the oil into two streams, each of which will be adjacent a side of the passage.

4. In an oil still, an oil passage, means providing gas passages adjacent each side of the oil passage, said oil passage presenting an upwardly convex bottom tending to divide the oil into two streams, each of which will be adjacent a side of the passage, and baffles arranged in said oil passage adjacent each side for causing the oil to flow from side to side.

5. In an oil still, an oil passage, means providing gas passages adjacent each side of the oil passage, said oil passage presenting an upwardly convex bottom tending to divide the oil into two streams, each of which will be adjacent a side of the passage, baffles arranged in said oil passage adjacent each side for causing the oil to flow from side to side, and a steam pipe arranged centrally of said convex bottom.

6. An oil still having a vertical central gas passage, a helical oil passage arranged about said vertical central passage having an inlet at its top and vapor outlets at various levels, a helical gas passage about the oil passage, said helical gas passage and vertical central passage being in communication at their upper ends and having an upper outlet, a valve or damper in said outlet, an outlet adjacent the bottom of said central gas passage, and a valve or damper in the last mentioned outlet.

7. An oil still having a vertical central gas passage, a helical oil passage arranged about said vertical central passage and having an inlet at its top and vapor outlets at various levels, a helical gas passage about the oil passage, said helical gas passage and vertical central passage being in communication at their upper ends and having an upper outlet, a valve or damper in said outlet, a passage establishing communication between the lower ends of said gas passages, a valve or damper in said passage, an outlet adjacent the bottom of said central gas passage, and a valve or damper in the last mentioned outlet.

8. An oil still hving a vertical central gas passage, a helical oil passage arranged about said vertical central passage and having an inlet at its top and vapor outlets at various levels, a helical gas passage about the oil passage, said helical gas passage and vertical central passage being in communication at their upper ends and having an upper outlet, a valve or damper in said outlet, an outlet adjacent the bottom of said central gas passage, and a valve or damper in the last mentioned outlet, said helical gas and oil passages being so arranged that oil descending in the oil passages will flow in a direction opposite to the flow of gases ascending in the gas passage.

In testimony whereof we have signed our names to this specification.

CLARENCE F. HANSON.
PERRY VANDERVORT.